United States Patent
Ned et al.

(10) Patent No.: US 9,739,680 B2
(45) Date of Patent: Aug. 22, 2017

(54) FLAT COVERED LEADLESS PRESSURE SENSOR ASSEMBLIES SUITABLE FOR OPERATION IN EXTREME ENVIRONMENTS

(71) Applicant: KULITE SEMICONDUCTOR PRODUCTS, INC., Leonia, NJ (US)

(72) Inventors: Alexander A. Ned, Kinnelon, NJ (US); Joseph R. VanDeWeert, Maywood, NJ (US); Leo Geras, Pearl River, NY (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 0 days.

(21) Appl. No.: 15/339,182

(22) Filed: Oct. 31, 2016

(65) Prior Publication Data
US 2017/0052084 A1 Feb. 23, 2017

Related U.S. Application Data

(63) Continuation of application No. 14/151,775, filed on Jan. 9, 2014, now Pat. No. 9,513,181, which is a (Continued)

(51) Int. Cl.
*G01L 7/08* (2006.01)
*G01L 19/06* (2006.01)
(Continued)

(52) U.S. Cl.
CPC ........ *G01L 19/0681* (2013.01); *G01L 9/0044* (2013.01); *G01L 9/0048* (2013.01);
(Continued)

(58) Field of Classification Search
CPC .. G01L 19/0681; G01L 9/0048; G01L 9/0054
(Continued)

(56) References Cited

U.S. PATENT DOCUMENTS

| 4,208,782 A | 6/1980 | Kurtz et al. |
| 4,773,269 A | 9/1988 | Knecht et al. |

(Continued)

OTHER PUBLICATIONS

Authors: A.D. Kurtz, A.A. Ned, and A.H. Epstein, Title: Improved Ruggedized SOI Transducers Operational Above 600 C, Publisher: Kulite Semiconductor Products, Inc., Publication: Twenty-First Transducer Workshop, Lexington, Maryland, Date: Jun. 22-23, 2004, pp. 1-10.

*Primary Examiner* — Lisa Caputo
*Assistant Examiner* — Roger Hernandez-Prewitt
(74) *Attorney, Agent, or Firm* — Troutman Sanders LLP; James E. Schutz; Mark Lehi Jones

(57) ABSTRACT

This disclosure provides example methods, devices and systems associated with flat covered leadless pressure sensor assemblies suitable for operation in extreme environments. In one embodiment, a system may comprise a semiconductor substrate having a first side and a second side; a diaphragm disposed on the first side of the semiconductor substrate; a first cover coupled to the first side of the semiconductor substrate such that it overlays at least the diaphragm, wherein a pressure applied at the first cover is transferred to the diaphragm; and a sensing element disposed on the second side of the semiconductor substrate, wherein the sensing element is used to measure the pressure.

20 Claims, 4 Drawing Sheets

Related U.S. Application Data continuation of application No. 13/213,448, filed on Aug. 19, 2011, now Pat. No. 8,656,784.

(51) Int. Cl.
  *G01L 9/00* (2006.01)
  *G01L 19/00* (2006.01)

(52) U.S. Cl.
  CPC ........ *G01L 9/0054* (2013.01); *G01L 19/0627* (2013.01); *G01L 9/0047* (2013.01); *G01L 19/0076* (2013.01); *Y10T 29/49826* (2015.01)

(58) Field of Classification Search
  USPC .......................... 73/715, 723, 725, 726, 727
  See application file for complete search history.

(56) References Cited

U.S. PATENT DOCUMENTS

| | | |
|---|---|---|
| 5,125,275 A | 6/1992 | Wilda et al. |
| 5,436,491 A | 7/1995 | Hase et al. |
| 5,877,425 A | 3/1999 | Suzuki et al. |
| 5,973,590 A * | 10/1999 | Kurtz et al. ........ G01L 19/0084 338/36 |
| 6,406,636 B1 * | 6/2002 | Vaganov .............. B23K 1/0016 216/2 |
| 6,612,178 B1 * | 9/2003 | Kurtz et al. .......... G01L 9/0052 73/715 |
| 7,290,453 B2 * | 11/2007 | Brosh ................... G01L 9/0052 73/720 |
| 7,508,040 B2 | 3/2009 | Nikkel et al. |
| 2009/0301210 A1 | 12/2009 | Becher et al. |

* cited by examiner

PiezoResistor Area / Distance From Center

Distance From Center

FLAT COVERED LEADLESS PRESSURE SENSOR ASSEMBLIES SUITABLE FOR OPERATION IN EXTREME ENVIRONMENTS

CROSS REFERENCE TO RELATED APPLICATION

This application is a continuation claiming priority under 35 U.S.C. §120 to U.S. patent application Ser. No. 14/151,775, filed 9 Jan. 2014, and published as U.S. Patent Application Publication No. US2014/0123765 on 8 May 2014, entitled "FLAT COVERED LEADLESS PRESSURE SENSOR ASSEMBLIES SUITABLE FOR OPERATION IN EXTREME ENVIRONMENTS." application Ser. No. 14/151,775 is a continuation claiming priority under 35 U.S.C. §120 to U.S. patent application Ser. No. 13/213,448, filed 19 Aug. 2011 and issued as U.S. Pat. No. 8,656,784 on 25 Feb. 2014, the contents of which are hereby incorporated by reference in its entirety as if fully set forth below.

FIELD OF THE INVENTION

The invention relates to pressure sensors, and more particularly to flat covered leadless pressure sensor assemblies suitable for operation in extreme environments.

BACKGROUND

Many pressure sensor assemblies of the prior art are improperly equipped to withstand extreme environments, such as harsh temperature environments, high vibration environments, and conductive and corrosive media environments.

Traditional wire bonded pressure sensors cannot be exposed to any of these environments without damage. As another example, sensors that utilize oil-filled technology, can be exposed to conductive and corrosive environments, however the operable temperature range of the sensor is significantly limited because of the presence of oil. As yet another example, leadless sensors, wherein the sensing elements are mounted upside down onto appropriately designed headers such that only the backside of the sensing element is exposed to the pressure media, are suitable for device operation in most extreme environments. In this particular embodiment, illustrated in FIG. 1, however, when exposed to a pressure media with high-dynamic thermal and flow conditions, the exposed micro-machined diaphragm can experience uneven heating, and other flow-related stresses, because of the uneven shape of the exposed surface. Therefore, in combustion measuring and hypersonic measuring applications, the error associated with dynamic heat and flow related phenomenon becomes significant and limits the accuracy of traditional leadless sensors.

Because of the limitations presented in the above-mentioned prior art, there is a need for a pressure sensor assembly suitable for operation including in extreme environments such as dynamic, ultra-high temperature heating environments, light and heat flash environments, high-speed, flow-related environments, and the like.

BRIEF SUMMARY

The various embodiments of the present invention provide an enclosed, flat covered leadless pressure sensor assembly suitable for operation in extreme environments, such as dynamic, ultra-high temperature heating, light and heat flash, and high-speed, flow-related environments. The pressure sensor assembly of the present invention comprises a substrate having a boss region and a membrane region defined on a first side, wherein the boss region and the membrane region collectively form a pressure sensing diaphragm. The pressure sensor assembly further comprises a cover that is attached to the first side of the substrate such that it covers at least the diaphragm. The cover has a uniform flat top surface and promotes a uniformly applied pressure. An adhesive layer may be disposed between the substrate and the cover to enhance the bond therebetween.

Embodiments of the pressure sensor assembly may further comprise a sensing element attached to a second side of the substrate, wherein the sensing element is adapted to output a signal substantially indicative of the applied pressure. In some embodiments, the pressure sensor assembly may further comprise a contact glass cover attached to the second side of the substrate such that it covers and hermetically seals at least the sensing element.

DETAILED DESCRIPTION

Figures 1A, 1B:
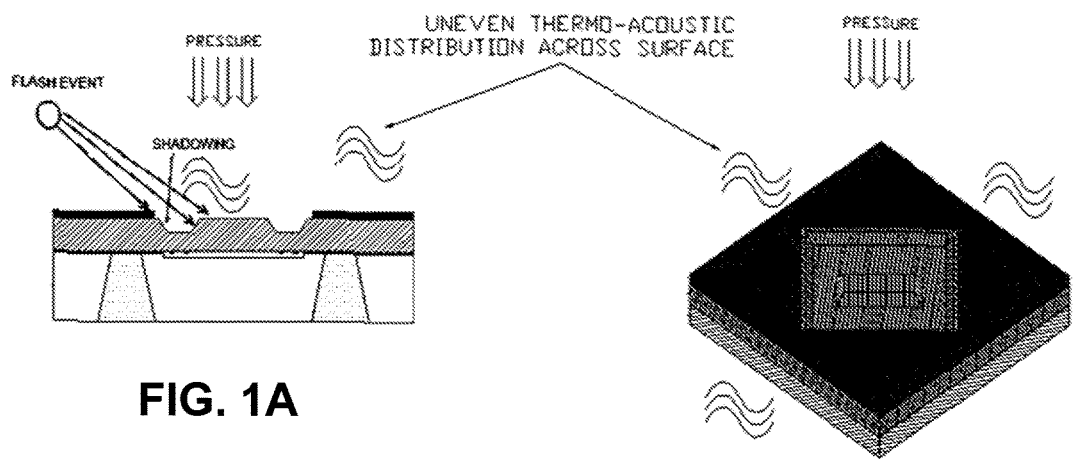
FIGS. 1A and 1B illustrate an embodiment of a prior art leadless pressure sensor assembly.

Although preferred embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways. Also, in describing the preferred embodiments, specific terminology will be resorted to for the sake of clarity. It must also be noted that, as used in the specification and the appended claims, the singular forms "a," "an," and "the" include plural referents unless the context clearly dictates otherwise.

Also, in describing the preferred embodiments, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" one particular value and/or to "about" or "approximately" another particular value. When such a range is expressed, another embodiment includes from the one particular value and/or to the other particular value.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Referring now to the drawings, in which like numerals represent like elements, exemplary embodiments of the present invention are herein described. It is to be understood that the FIGS. and descriptions of the present invention have been simplified to illustrate elements that are relevant for a clear understanding of the present invention, while eliminating, for purposes of clarity, many other elements found in typical pressure sensor assemblies and methods of making and using the same. Those of ordinary skill in the art will recognize that other elements are desirable and/or required in order to implement the present invention. However, because such elements are well known in the art, and because they do not facilitate a better understanding of the present invention, a discussion of such elements is not provided herein.

Exemplary embodiments of the present invention provide a substantially enclosed, flat covered, leadless pressure sensor assembly suitable for operation in extreme environments such as dynamic, ultra-high temperature heating, light and heat flash, and high-speed, flow-related environments. The various embodiments of the pressure sensor assembly of the present invention generally comprise a substrate having a micro-machined diaphragm defined on a first side and a sensing element attached to a second side. A cover is attached to the first side of the substrate, such that it substantially encloses the sensing diaphragm and the substrate. The cover has a uniform flat top surface, which enables an applied pressure and temperature to be uniformly distributed across the cover. The pressure sensor assembly of the present invention may be adjusted to a desired pressure range, therefore enabling high magnitude pressure readings and highly accurate and stress isolated pressure measurements in extreme environments.

Figures 2A, 2B:
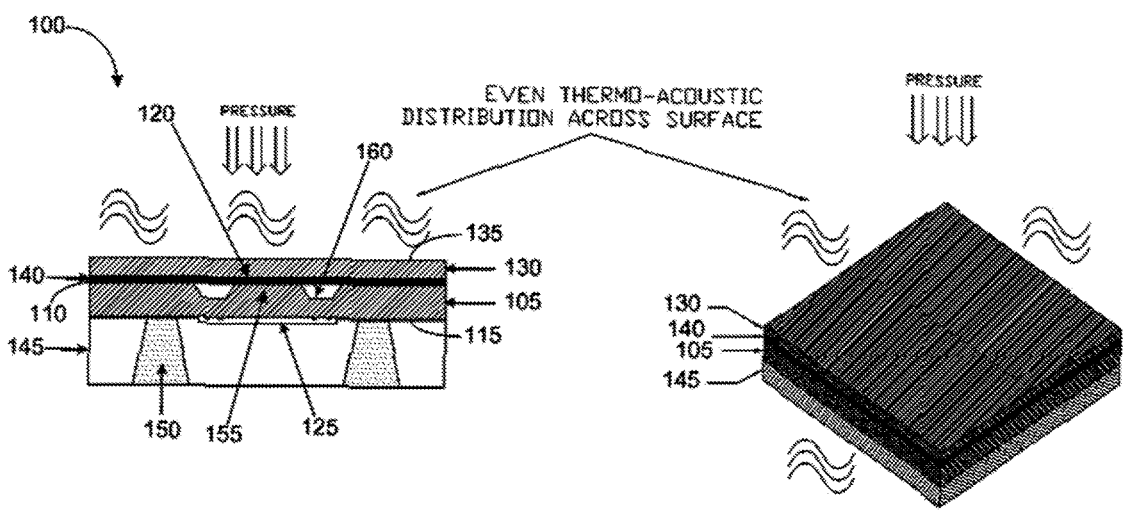
FIGS. 2A and 2B illustrate an embodiment of a flat covered leadless pressure sensor assembly in accordance with exemplary embodiments of the present invention.

An exemplary embodiment of the pressure sensor assembly 100 of the present invention is illustrated in FIGS. 2A and 2B. The pressure sensor assembly 100 comprises a substrate 105 having a first side 110 and a second side 115. The substrate 105 may be made of silicon because silicon has high thermal conductivity and high temperature tolerance properties. The substrate 105 may be of various geometries and dimensions. One skilled in the art will appreciate that these properties are dependent on the type of environment and desired pressure range in which the pressure sensor assembly is designed to operate. A diaphragm 120, which comprises a boss region 155 and a membrane region 160, is micro-machined on the first side 110 of the substrate 105, and is configured to deflect upon receiving an applied pressure. A series of sensing elements 125 are mounted on the second side 115 of the substrate 105 such that it is aligned with the diaphragm 120. In an exemplary embodiment, the sensing elements 125 are piezoresistive sensing elements comprising four piezoresistors, and outputs a signal substantially indicative of the applied pressure. The sensing elements are mounted of the back side of the substrate to isolate them from the pressure media.

As also illustrated in FIGS. 2A and 2B, a cover 130 is attached to the first side 110 of the substrate 105. In an exemplary embodiment, the cover 130 is made of silicon and is monolithically attached to the substrate 105 during substrate fabrication. The cover 130 encloses the diaphragm 120 and substantially, if not completely, encloses the substrate 105. The cover 130 is of a uniform thickness, and therefore has a substantially flat top surface 135, which promotes uniformity in the distribution of stress and thermal effects across a top surface 135 of the cover 130 that are commonly associated with dynamic heating and other flow-related perturbations, distinguishing the pressure sensor assembly of the present invention from the prior art pressure sensor assembly illustrated in FIGS. 1A and 1B, as the uncovered diaphragm in the prior art assembly causes uneven thermoacoustic distributions across the surface.

The cover 130 may be of various thicknesses, however, as stated above, the cover 130 is of a uniform thickness throughout. One skilled in the art will appreciate that the thickness of the cover 130 may be adjusted to suit a particular pressure range and operating environment. One skilled in the art will also appreciate that the thickness of the diaphragm 120 may also be adjusted to suit a desired pressure range and may be complementary to the thickness of the cover 130. The length, width, and overall geometry of the cover 130 can be of many dimensions and shapes, respectively. In an exemplary embodiment, however, the length, width, and geometry of the cover 130 corresponds to the length, width, and geometry of the substrate 105, such that the diaphragm 120 and the substrate 105 are substantially, if not fully, covered by the cover 130. Accordingly, the diaphragm 120 and the substrate 105 are effectively shielded from extreme environments.

In some embodiments, the top surface 135 of the cover 130 may be coated with various combinations of inert, high temperature metal thin films, for example but not limited to, gold and platinum. The presence of these highly reflective metal films enables further protection to flash and heat without introducing any performance-related errors to the diaphragm 120.

In some embodiments, an "adhesive" layer 140 may be disposed between the substrate 105 and the cover 130 to strengthen the bond therebetween. The adhesive layer 140 provides a "glue line" between the substrate 105 and the cover 130, via an electrostatic attachment mechanism technique, and provides thermal insulation between the cover 130 and the diaphragm 120. Although some exemplary embodiments of the present invention comprise an adhesive layer 140, it shall be understood that the pressure sensor assembly 100 may or may not comprise an adhesive layer 140. The adhesive layer 140 may be made from many materials, for example but not limited to, Pyrex® glass.

A contact glass cover 145 may be attached to the second side 115 of the substrate 105, such that it hermetically seals the sensing element 125 from extreme environments. In some embodiments, a glass frit filler may be used to further secure the contact glass cover 145 to the second side 115 of the silicon substrate 105. Also, it shall be understood that the shape of the contact glass cover 140 corresponds to the shape of the substrate 105, and thus can be of many geometries. The contact glass completely covers the sensing elements 125 sealing them in a hermetic cavity isolated from the pressure media. Because the sensing element 125 is effectively shielded from the external environment, high temperatures and extreme environments will not interfere with its accuracy. As also illustrated, the contact glass cover 145 may define two or more apertures 150 that are filled with a conductive metal-glass frit, which enables electrical communication between the sensing element 125 and corresponding output devices.

Standard leadless high pressure (e.g. 1000 PSI and higher) sensor assemblies, such as the one illustrated in FIGS. 1A and 1B, exhibit non-linearity due to imperfect stress gradients. In these pressure sensor assemblies, as the diaphragm thickens in comparison to the thickness of the bossed area, the boss region begins to have less effect on the stress gradients, which means there is less stress concentration in the piezoresistors. An unexpected advantage of the pressure sensor assembly 100 of the present invention, however, is that it stiffens the boss region 155 to a greater extent as compared to the rest of the diaphragm 120. Specifically, the cover 130 adds stiffness to the entire diaphragm, making it deflect less at the same thickness, as the cover 130 is clamped directly onto the boss region 155.

Figure 3A:
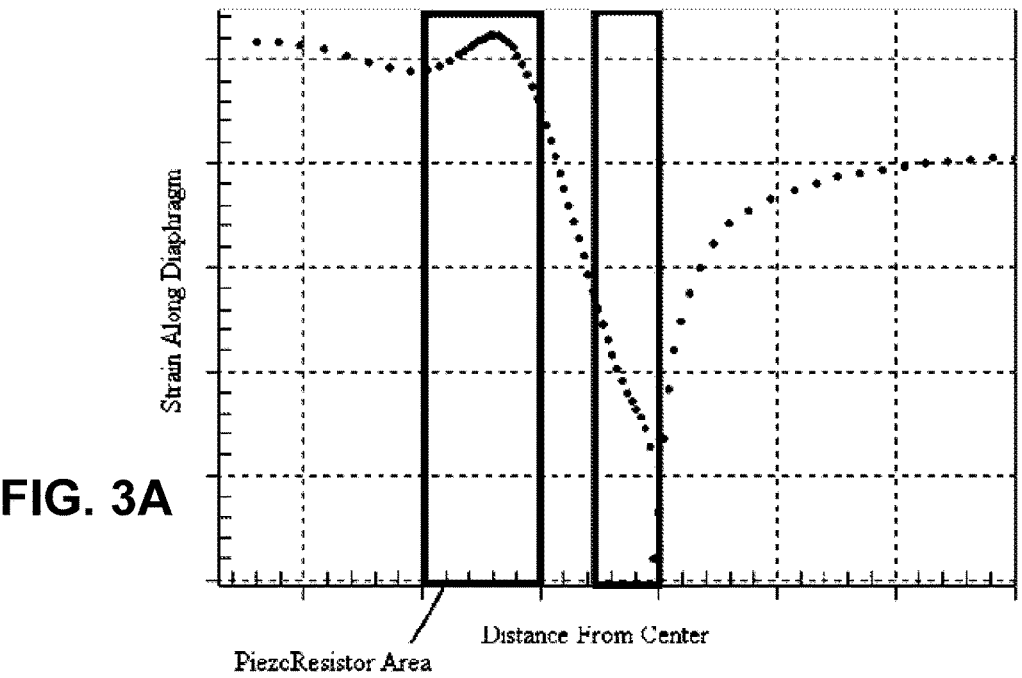
FIGS. 3A and 3B graphically illustrate stress concentrations for the prior art pressure sensor assembly, illustrated in FIGS. 1A and 1B, and the pressure sensor assembly of the present invention, illustrated in FIGS. 2A and 2B, respectively.
Figure 3B:
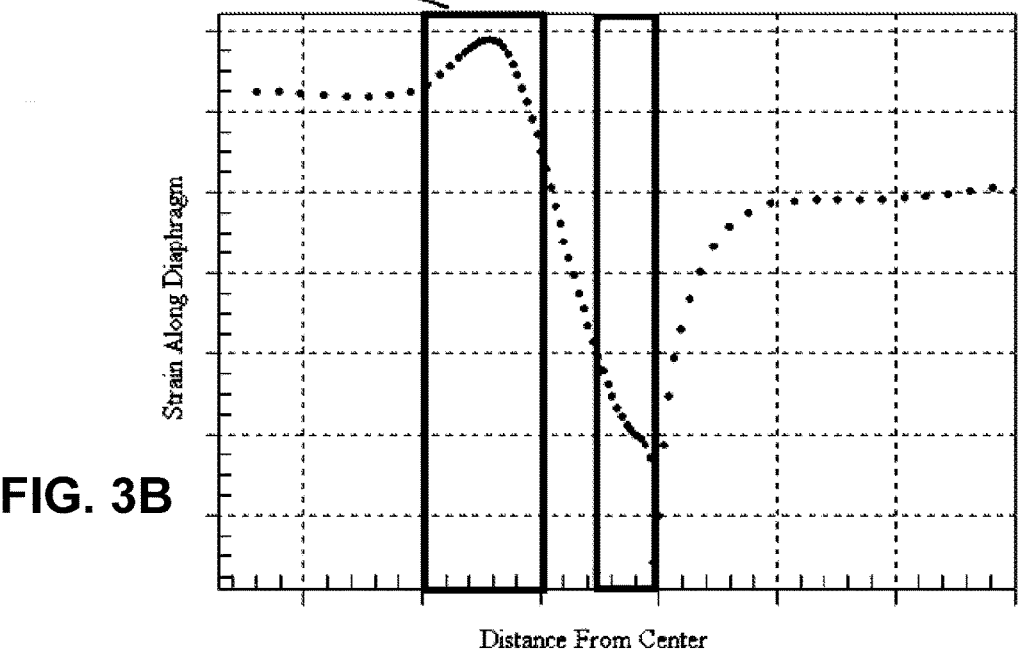

FIGS. 3A and 3B graphically illustrate the stress concentrations of the prior art pressure sensor assembly and the pressure sensor assembly 100 of the present invention, respectively. As illustrated in FIG. 3B, the pressure sensor assembly 100 of the present invention has sharper stress gradients and a better defined stress concentration, which allows for more precise placement of the piezoresistors. This consequently leads to an even distribution of stress across the four piezoresistors, which provides a more linear device. The cover 130 increases stiffness, improves thermal isolation, and promotes uniform stress across the sensing element 125. These properties enable accurate pressure measurements in combustion engine applications and other applications where extreme thermo-acoustic and flow events are experienced.

Figures 4A, 4B:
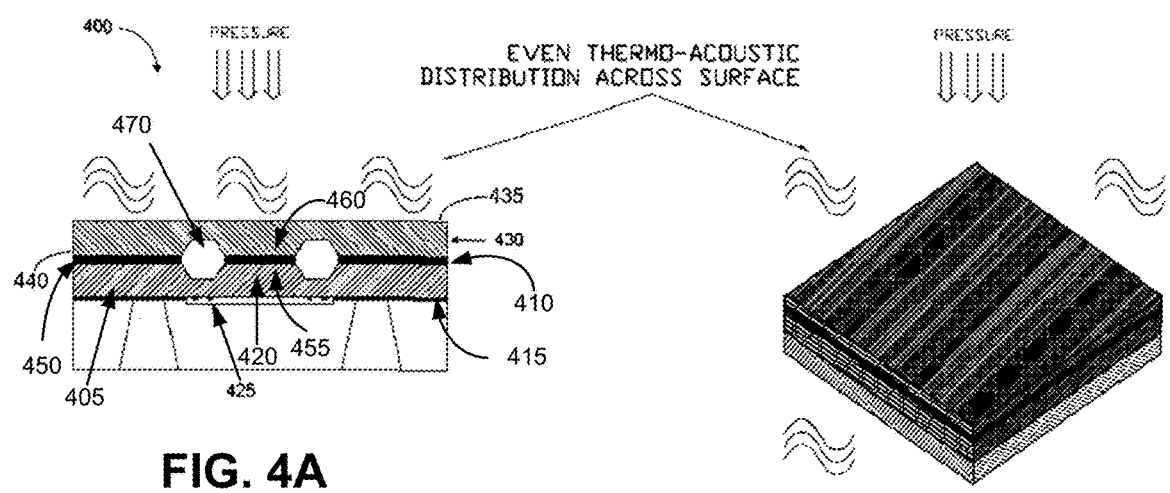
FIGS. 4A and 4B illustrate a second embodiment of a flat covered leadless pressure sensor assembly in accordance with exemplary embodiments of the present invention using a shaped cover.

A second exemplary embodiment of the pressure sensor assembly 400 of the present invention is illustrated in FIGS. 4A and 4B. This embodiment is similar to the embodiment illustrated in respective FIGS. 2A and 2B, however the cover 130 has been replaced by a micro-machined cover 430 having cutout 470 region(s). The example embodiments, as illustrated in FIGS. 4A and 4B, can include a semiconductor substrate 405 having a first side 410 and a second side 415. In an example implementation, a diaphragm 420 is disposed on the first side 410 of the semiconductor substrate 405. The diaphragm 420 can include a first boss region 455. In an example implementation, the first boss region 455 may be defined between the cutout regions 470. In this example embodiment, a first cover 430 can overlay at least the diaphragm 420. The first cover 430 can include a bottom surface 440 having a second boss region 460. In this example implementation, at least a portion of the bottom surface 440 may be in communication with the diaphragm 420. In certain example implementations, an adhesive layer 450 may be disposed between the semiconductor substrate 405 and the first cover 430, as discussed above with reference to FIG. 2A. According to an example implementation of the disclosed technology, the first cover 430 can include a uniformly flat outermost top surface 435. The top surface 435 of the cover 430 remains substantially flat and uniform to present an even surface for pressure and temperature affects, while the bottom surface 440 of the cover may be micro-machined by one or more of the standard micromachining techniques well known to those skilled in the art. This micromachining allows for even tighter refining of the stress concentrations in the piezoresistive sensing elements 425. The shaping also allows for better control of heat transfer between the cover 430 and sensor creating a more uniform temperature profile in the sensing elements 425. The shape of the cover 430 may be the same as the shape of the diaphragm but it may also be different depending on the desired stress and temperature profiles.

One skilled in the art will appreciate that materials other than silicon may be used to make pressure sensors. Other high temperature semiconductor materials, for example, silicon carbide may be used for many of the pressure sensor assembly components to make a robust, extremely high temperature sensor. For example, making the cover from silicon carbide increases the durability of the sensor, allowing for long term survivability in extremely harsh environments. As another example, making the substrate layer and piezoresistors from silicon carbide allows for a much higher temperature sensor. It is also possible to make the contact layer from silicon carbide, which allows for a more robust sensor.

Numerous characteristics and advantages have been set forth in the foregoing description, together with details of structure and function. While the invention has been disclosed in several forms, it will be apparent to those skilled in the art that many modifications, additions, and deletions, especially in matters of shape, size, and arrangement of parts, can be made therein without departing from the spirit and scope of the invention and its equivalents as set forth in the following claims. Therefore, other modifications or embodiments as may be suggested by the teachings herein are particularly reserved as they fall within the breadth and scope of the claims here appended.

The invention claimed is:

1. A system, comprising:
   a semiconductor substrate having a first side and a second side;
   a diaphragm disposed on the first side of the semiconductor substrate, the diaphragm comprising a first boss region;
   a first cover overlaying at least the diaphragm, the first cover comprising:
      a bottom surface having a second boss region, wherein at least a portion of the bottom surface is in communication with the diaphragm; and
      a uniformly flat outermost top surface coated with an inert and reflective metal film; and
   a sensing element disposed on the second side of the semiconductor substrate, wherein the sensing element is configured to measure a pressure.

2. The system of claim 1, wherein the sensing element, the diaphragm, and the cover are mechanically coupled such that a pressure applied to the uniformly flat outermost top surface of the first cover is in communication with the sensing element.

3. The system of claim 1, wherein the diaphragm includes a membrane region disposed on the first side of the semiconductor substrate.

4. The system of claim 1, wherein the sensing element is a piezoresistive network.

5. The system of claim 1, further comprising a second cover coupled to the second side of the semiconductor substrate such that the second cover overlays at least the sensing element.

6. The system of claim 5, wherein the second cover is composed of glass.

7. The system of claim 5, wherein the semiconductor substrate and the second cover form a hermetic seal.

8. The system of claim 1, wherein the second boss region of the bottom surface of the first cover is micromachined to include a cut-out opposite the diaphragm.

9. The system of claim 8, wherein a shape of the cut-out mirrors a shape of the diaphragm.

10. The system of claim 1, further comprising an adhesive layer disposed between the semiconductor substrate and the first cover.

11. The pressure sensor assembly of claim 1, wherein the first cover is composed of a semiconductor material.

12. A method, comprising:
providing a semiconductor substrate having a first side and a second side;
disposing a diaphragm on the first side of the semiconductor substrate;
disposing a first boss region on the first side of the semiconductor substrate;
disposing a second boss region on bottom surface of a cover, wherein the cover is characterized by a uniformly flat top surface;
coating the uniformly flat top surface with an inert and reflective metal film;
disposing the cover on at least the diaphragm, wherein the second boss region of the bottom surface is coupled with the diaphragm;
disposing a sensing element on the second side of the semiconductor substrate, wherein the sensing element is configured to measure the pressure transferred through the cover to the diaphragm.

13. The method of claim 12, wherein disposing the diaphragm on the first side of the semiconductor substrate includes micromachining the first side of the semiconductor substrate.

14. The method of claim 12, wherein disposing the diaphragm on the first side of the semiconductor substrate includes disposing a membrane region on the first side of the semiconductor substrate.

15. The method of claim 12, wherein the sensing element is a piezoresistive network.

16. The method of claim 12, further comprising coupling a second cover to the second side of the semiconductor substrate such that the second cover overlays at least the sensing element.

17. The method of claim 16, wherein the semiconductor substrate and the second cover form a hermetic seal.

18. The method of claim 12, wherein a shape of the second boss mirrors a shape of the first boss.

19. The method of claim 12, further comprising disposing an adhesive layer between the semiconductor substrate and the first cover.

20. The method of 12, wherein the first cover comprises a semiconductor material.

* * * * *